US009829956B2

(12) United States Patent
Tannenbaum et al.

(10) Patent No.: US 9,829,956 B2
(45) Date of Patent: Nov. 28, 2017

(54) APPROACH TO POWER REDUCTION IN FLOATING-POINT OPERATIONS

(71) Applicant: NVIDIA Corporation, Santa Clara, CA (US)

(72) Inventors: David Conrad Tannenbaum, Austin, TX (US); Colin Sprinkle, Sunnyvale, CA (US); Stuart F. Oberman, Sunnyvale, CA (US); Ming Y. Siu, Santa Clara, CA (US); Srinivasan Iyer, Austin, TX (US); Ian-Chi Yan Kwong, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 618 days.

(21) Appl. No.: 13/683,362

(22) Filed: Nov. 21, 2012

(65) Prior Publication Data

US 2014/0143564 A1 May 22, 2014

(51) Int. Cl.
*G06F 1/32* (2006.01)
*G06F 7/483* (2006.01)
*G06F 7/487* (2006.01)

(52) U.S. Cl.
CPC .......... *G06F 1/3234* (2013.01); *G06F 1/3237* (2013.01); *G06F 1/3243* (2013.01); *G06F 1/3287* (2013.01); *G06F 7/483* (2013.01); *G06F 7/4876* (2013.01); *Y02B 60/1221* (2013.01); *Y02B 60/1239* (2013.01); *Y02B 60/1282* (2013.01)

(58) Field of Classification Search
CPC .................. G06F 7/483; G06F 7/5443

USPC ................ 708/495, 324, 501, 523
See application file for complete search history.

(56) References Cited

U.S. PATENT DOCUMENTS

2003/0212726 A1* 11/2003 Luick ............... G06F 7/483
708/501
2004/0230849 A1 11/2004 Dhong et al.
2006/0101244 A1* 5/2006 Siu et al. ............... 712/221
2006/0136540 A1* 6/2006 Tang et al. ............. 708/495
2006/0143260 A1 6/2006 Peng et al.
2006/0212505 A1* 9/2006 Islam .................... 708/620
(Continued)

FOREIGN PATENT DOCUMENTS

TW      I2663164 B    6/2006
TW      I261159 B     9/2006

OTHER PUBLICATIONS

Zichu Qi et al, Design of Low-Cost High-performance Floating-point Fused Multiply-Add with Reduced Power, 2010, IEEE, pp. 206-211.*

(Continued)

*Primary Examiner* — Michael D Yaary
(74) *Attorney, Agent, or Firm* — Artegis Law Group, LLP (57) ABSTRACT

An approach is provided for enabling power reduction in floating-point operations. In one example, a system receives floating-point numbers of a fused multiply-add instruction. The system determines the fused multiply-add instruction does not require compliance with a standard of precision for floating-point numbers. The system generates gating signals for an integrated circuit that is configured to perform operations of the fused multiply-add instruction. The system then sends the gating signals to the integrated circuit to turn off a plurality of logic gates included in the integrated circuit.

20 Claims, 6 Drawing Sheets

(56) References Cited

U.S. PATENT DOCUMENTS

2007/0203967 A1* 8/2007 Dockser ............. G06F 7/49942
                                                              708/495
2007/0266071 A1* 11/2007 Dockser et al. ............. 708/495
2014/0122554 A1* 5/2014 Hickmann et al. ........... 708/523

OTHER PUBLICATIONS

Wikibooks, Electronics/Flip Flops, Nov. 14, 2011, pp. 1-6.*

* cited by examiner

APPROACH TO POWER REDUCTION IN FLOATING-POINT OPERATIONS

BACKGROUND OF THE INVENTION

Field of the Invention

The present invention generally relates to integrated circuits, and, more specifically, to an approach for reducing power in floating-point operations of integrated circuits.

Description of the Related Art

A processor in a computer is typically configured to carry out floating-point operations for applications. For example, a conventional computer system may include a central processing unit (CPU) or a graphics processing unit (GPU) that is configured to carry out floating-point operations. A floating point is a way for a computer to represent a real number in a way that can support a wide range of values.

The term floating-point refers to the fact that the decimal point (or binary point) can "float". For example, a processor can place the decimal point anywhere relative to the significant digits of the number. This position is indicated separately in the internal representation of the floating-point number. Accordingly, floating-point representation may be thought of as a computer realization of scientific notation. Over the years, computer engineers have used a variety of floating-point representations in computers. Since the 1990s, the most commonly encountered representation is that defined by the Institute of Electrical and Electronics Engineers (IEEE) 754 Standard.

Processors that carry out floating-point operations typically must be compliant with standards of the IEEE 754 Standard. In high-performance computing, full IEEE-precision and rounding compliance is necessary. Unfortunately, such support comes with a cost in both area and power consumption on an integrated circuit. The cost is an extra burden particularly when the computations being performed do not require the precision and rounding compliance set forth by a standard.

As the foregoing illustrates, what is needed in the art is a more efficient approach to performing floating point operations in computer systems.

SUMMARY OF THE INVENTION

One implementation of the present technology includes a method for enabling power reduction in floating-point operations. The method includes receiving floating-point numbers, including an operand A, an operand B, and operand C of a fused multiply-add instruction, wherein the fused multiply-add instruction is represented as the operand A multiplied by the operand B plus the operand C; determining the fused multiply-add instruction does not require compliance with a standard of precision for floating-point numbers; generating gating signals for an integrated circuit that is configured to perform operations of the fused multiply-add instruction by identifying low-order bits of the operand C and identifying low-order bits of a product of the operand A multiplied by the operand B; and sending the gating signals to the integrated circuit to turn off a plurality of logic gates included in the integrated circuit.

Advantageously, the system enables several different intermediate trade-off points to be made between precision and power savings when performing floating point operations. The trade-off points are based on the degree to which low-order bits of floating-point numbers can be ignored in the quest to save energy that would otherwise be expended to calculate fully the low-order bits. In one implementation, the trade-off points are based on the relative differences in the exponents of operands of a fused multiply-add (FMA) instruction. By using partial precision, the system undergoes fewer switches among flip-flops in the integrated circuit and thus operates at a reduced power.

BRIEF DESCRIPTION OF THE DRAWINGS

So that the manner in which the above recited features of the present invention can be understood in detail, a more particular description of the invention, briefly summarized above, may be had by reference to implementations, some of which are illustrated in the appended drawings. It is to be noted, however, that the appended drawings illustrate only typical implementations of this invention and are therefore not to be considered limiting of its scope, for the invention may admit to other equally effective implementations.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
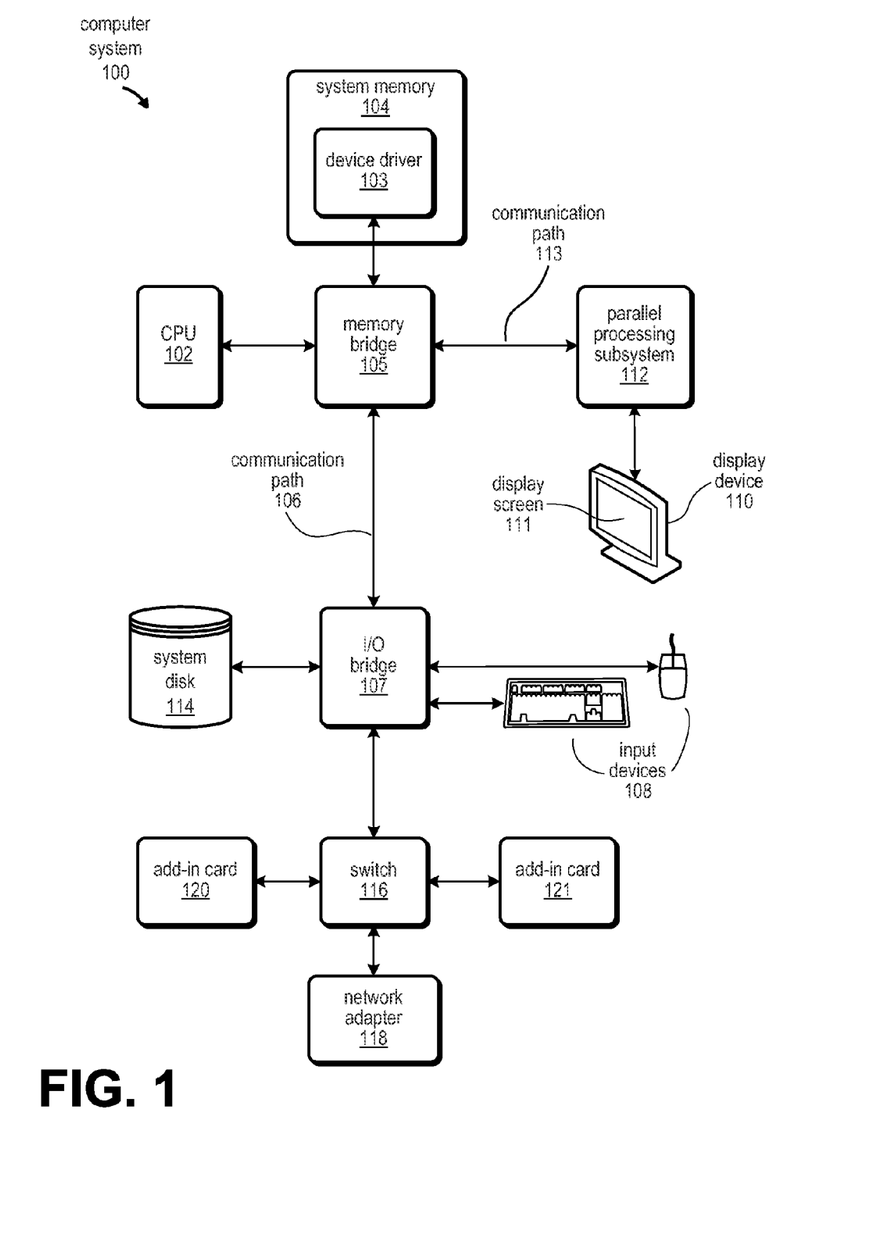
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 that includes a device driver 103. CPU 102 and system memory 104 communicate via an interconnection path that may include a memory bridge 105. Memory bridge 105, which may be, for example, a Northbridge chip, is connected via a bus or other communication path 106 (e.g., a HyperTransport link, etc.) to an input/output (I/O) bridge 107. I/O bridge 107, which may be, for example, a Southbridge chip, receives user input from one or more user input devices 108

(e.g., keyboard, mouse, etc.) and forwards the input to CPU 102 via path 106 and memory bridge 105. A parallel processing subsystem 112 is coupled to memory bridge 105 via a bus or other communication path 113 (e.g., a peripheral component interconnect (PCI) express, Accelerated Graphics Port (AGP), and/or HyperTransport link, etc.). In one implementation, parallel processing subsystem 112 is a graphics subsystem that delivers pixels to a display device 110 (e.g., a conventional cathode ray tube (CRT) and/or liquid crystal display (LCD) based monitor, etc.). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) and/or other port connections, compact disc (CD) drives, digital video disc (DVD) drives, film recording devices, and the like, may also be connected to I/O bridge 107. Communication paths interconnecting the various components in FIG. 1 may be implemented using any suitable protocols, such as PCI, PCI Express (PCIe), AGP, HyperTransport, and/or any other bus or point-to-point communication protocol(s), and connections between different devices that may use different protocols as is known in the art. A device is hardware or a combination of hardware and software.

As described in greater detail below in conjunction with FIGS. 3-9, parallel processing subsystem 112 includes parallel processing units (PPUs) configured to execute a software application (e.g., device driver 103) by using circuitry that enables power reduction in floating-point operations. Those packet types are specified by the communication protocol used by communication path 113. In situations where a new packet type is introduced into the communication protocol (e.g., due to an enhancement to the communication protocol), parallel processing subsystem 112 can be configured to generate packets based on the new packet type and to exchange data with CPU 102 (or other processing units) across communication path 113 using the new packet type.

In one implementation, the parallel processing subsystem 112 incorporates circuitry optimized for graphics and video processing, including, for example, video output circuitry, and constitutes a graphics processing unit (GPU). In another implementation, the parallel processing subsystem 112 incorporates circuitry optimized for general purpose processing, while preserving the underlying computational architecture, described in greater detail herein. In yet another implementation, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some implementations, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other implementations, I/O bridge 107 and memory bridge 105 might be integrated into a single chip. Large implementations may include two or more CPUs 102 and two or more parallel processing systems 112. The particular components shown herein are optional; for instance, any number of add-in cards or peripheral devices might be supported. In some implementations, switch 116 is eliminated, and network adapter 118 and add-in cards 120, 121 connect directly to I/O bridge 107.

Figure 2:
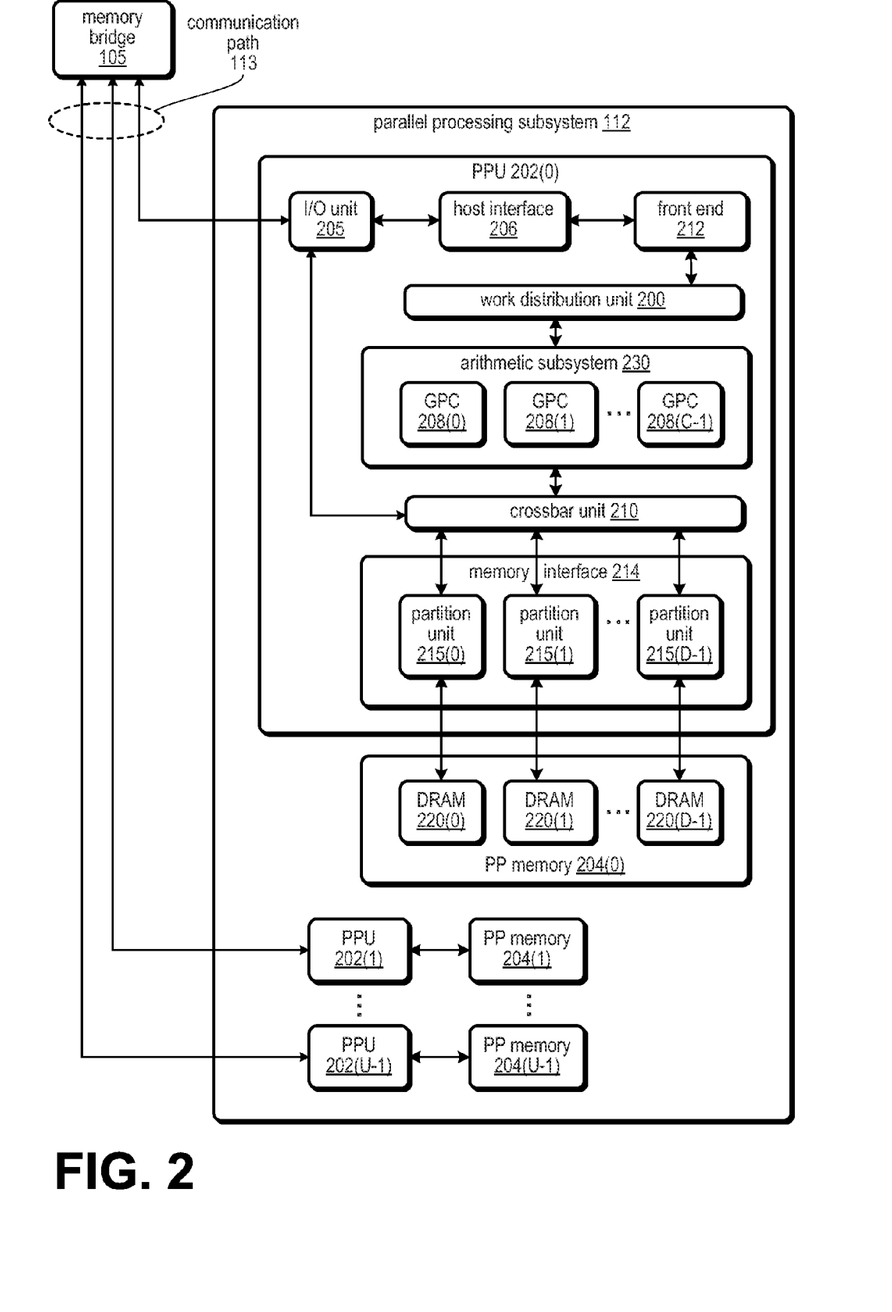
FIG. 2 is a block diagram illustrating a parallel processing subsystem, according to one embodiment of the present invention.

FIG. 2 is a block diagram illustrating a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some implementations, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some implementations, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some implementations, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O unit 205 that communicates with the rest of computer system 100 via communication path 113, which connects to memory bridge 105 (or, in one alternative implementation, directly to CPU 102). The connection of PPU 202 to the rest of computer system 100 may also be varied. In some implementations, parallel processing subsystem 112 is implemented as an add-in card that can be inserted into an expansion slot of computer system 100. In other implementations, a PPU 202 can be integrated on a single chip with a bus bridge, such as memory bridge 105 or I/O bridge 107. In still other implementations, some or all elements of PPU 202 may be integrated on a single chip with CPU 102.

In one implementation, communication path 113 is a PCIe link, in which dedicated lanes are allocated to each PPU 202, as is known in the art. Other communication paths may also be used. As mentioned above, a contraflow interconnect may also be used to implement the communication path 113, as well as any other communication path within the computer system 100, CPU 102, or PPU 202. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes an arithmetic subsystem 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks can include floating-point operations, such as A*B+C, a fused multiply-add (FMA) instruction. Work distribution unit 200 may be configured to fetch the operands (e.g., A, B, and C) corresponding to the tasks, or work distribution unit 200 may receive the operands (e.g., A, B, and C) from front end 212. Front end 212 ensures that GPCs 208 are configured to a valid state before the processing specified by the pushbuffers is initiated.

When PPU 202 is used for graphics processing, for example, the processing workload for each floating-point operation can be divided into approximately equal sized tasks to enable distribution of the operations to multiple GPCs 208. A work distribution unit 200 may be configured to produce tasks at a frequency capable of providing tasks to multiple GPCs 208 for processing. In one implementation, the work distribution unit 200 can produce tasks fast enough to simultaneously maintain busy multiple GPCs 208. By contrast, in conventional systems, processing is typically performed by a single processing engine, while the other processing engines remain idle, waiting for the single processing engine to complete its tasks before beginning their processing tasks. In some implementations of the present invention, portions of GPCs 208 are configured to perform different types of processing. For example, a first portion may be configured to perform vertex shading and topology generation. A second portion may be configured to perform tessellation and geometry shading. A third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other implementations, the number of partition units 215 may not equal the number of memory devices. Dynamic random access memories (DRAMs) 220 may be replaced by other suitable storage devices and can be of generally conventional design. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one implementation, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the implementation shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) implementation. In such implementations, little or no dedicated graphics (parallel processing) memory would be provided, and PPU 202 would use system memory exclusively or almost exclusively. In UMA implementations, a PPU 202 may be integrated into a bridge chip or processor chip or provided as a discrete chip with a high-speed link (e.g., PCIe) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

One embodiment of the invention may be implemented as a program product for use on a computer system, such as the computer system 100 of FIG. 1 for example. One or more programs of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Enabling Power Reduction in Floating-Point Operations

The present technology trades precision for power savings in floating-point intensive applications where power conservation is deemed the overriding goal, ranking above the need to comply with an IEEE standard. Example standards that provide rules for floating-point numbers include without limitation IEEE 754, IEEE 754-1985, IEEE 854-1987, and IEEE 754-2008, among other standards.

In some applications, strict compliance with an IEEE standard is unnecessary. For example, in computer graphics, there are cases in which slightly lower precision and/or less numerically ideal rounding operations are acceptable. For instance, in some graphics applications, a primary goal is to light the correct pixels, which typically does not require processing at a high precision. Integrated circuits configured to handle these tasks consume dynamic power. Dynamic power consumption is proportional to the fraction of the circuit that is switching components and toggling flip-flops. If fewer components of an integrated circuit are switching and/or toggling, then the integrated circuit is likely to consume less power. The present technology exploits allowable reductions in rounding fidelity in order to provide savings in dynamic power dissipation.

The present technology can be implemented on a GPU in which there is dedicated circuitry for rendering graphics, without a strict requirement of IEEE compliance for all operations. However, as further described below with reference to FIG. 8, a mode selector device 815 enables the arithmetic circuitry to be modal and support both an IEEE rounding-compliant mode and a non-compliant power-dissipation-reduced mode. This flexibility (e.g., the modal operation), enables the opportunistic use of power savings without sacrificing the ability to generate proper rounding in those situations where proper rounding is needed. To further support this utility argument, note that many iterative calculations, such as the Newton-Raphson method, do not require full IEEE-compliant calculations for intermediate operations. The description below includes a brief explanation of a floating-point number, followed by more details of techniques for reducing the amount of switching in an integrated circuit, and thus reducing dynamic power consumption.

Figure 3:
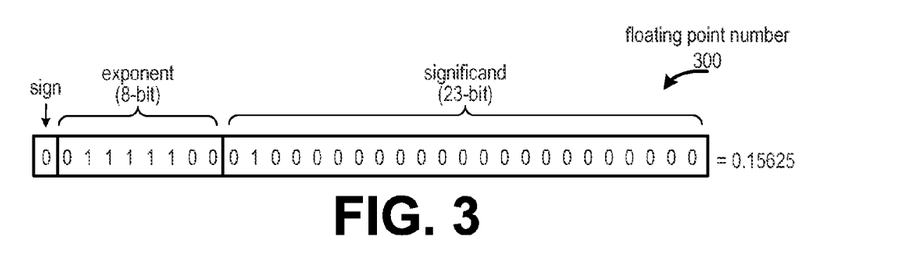
FIG. 3 is a diagram of an example floating point number, according to one embodiment of the present invention.

FIG. 3 is a diagram of an example floating point number 300, according to one embodiment of the present invention. Floating-point numbers in IEEE 754 format consist of three fields: a sign bit, a biased exponent, and a fraction. The following example illustrates the meaning of each. The decimal number 0.1562500 represented in binary is 0.00101 in base-2 (that is, $\frac{1}{8}+\frac{1}{32}$ in decimal form). Analogous to scientific notation, where numbers are written to have a single non-zero digit to the left of the decimal point, this number is rewritten so the number has a single 1 bit to the left of the "binary point." The number is then multiplied by the appropriate power of 2 to compensate for shifting the bits left by three positions, as shown in the following Equation 1:

$$0.00101_2 = 1.01_2 \times 2^{-3} \quad \text{Equation 1.}$$

In Equation 1, the fraction is $0.01_2$ and the exponent is $-3$. In the example of FIG. 3, the three fields in the IEEE 754 representation of this number are as follows. A sign=0, because the number is positive. (1 indicates negative.). A biased exponent=−3 plus the "bias." In single precision, the bias is 127, so in this example the biased exponent is 124. In double precision, the bias is 1023, so the biased exponent in this example is 1020. A fraction=0.01000 . . . in base-2.

The IEEE 754 Standard adds a bias to the exponent so that numbers can in many cases be compared conveniently by the same hardware that compares signed 2's-complement integers. Using a biased exponent, the lesser of two positive floating-point numbers will come out "less than" the greater following the same ordering as for sign and magnitude integers. If two floating-point numbers have different signs, the sign-and-magnitude comparison also works with biased exponents. However, if both biased-exponent floating-point numbers are negative, then the ordering must be reversed. If the exponent were represented as, say, a 2's-complement number, comparison to see which of two numbers is greater would not be as convenient. In this example of FIG. 3, the significand is 23 bits, where the leading 1 bit is omitted. Since all numbers except zero start with a leading 1, the leading 1 is implicit and does not need to be stored, thereby providing an extra bit of precision for "free." In another implementation, the significand includes 24 bits.

In typical floating-point data paths, there is support for the operation A*B+C, where each operand A, B, and C is a floating-point number in a fused multiply-add (FMA) instruction. Note the letters "A", "B", and "C" are used here as symbols that identify operands; the present technology is not limited to the use of these particular symbols A, B, and C. This building-block also provides for the fused add (Fadd) and fused multiply (Fmul) instructions via the following equations 2 and 3:

$$F\text{add} = A*1.0 + C. \quad \text{Equation 2.}$$

$$F\text{mul} = A*B + 0.0. \quad \text{Equation 3.}$$

In an IEEE-compliant scenario, the internal precision of the A*B product must be maintained in its entirety regardless of the relative magnitude of the C operand in order to ensure the proper rounding. As discussed below with reference to FIGS. 7 and 8, such compliance leads to a relatively large multiplier array and a very wide shifter array for either the product or the C addend, or both (depending on the particular implementation).

Figure 4:
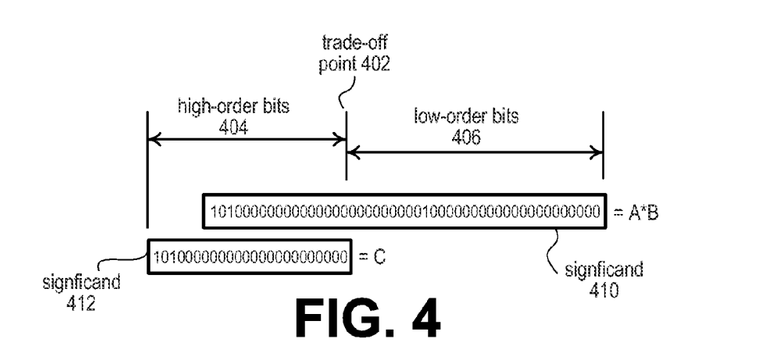
FIG. 4 is a conceptual diagram of an example fused multiply-add (FMA) instruction, according to one embodiment of the present invention.

FIG. 4 is a conceptual diagram of an example fused multiply-add (FMA) instruction, according to one embodiment of the present invention. In this example, a significand 410 of an A*B product includes 47 bits, where the leading 1 bit is omitted. A signficand 412 of a C addend. The addend 412 includes 23 bits plus the implied 1. The system evaluates the FMA by first inspecting the exponents of the incoming operands. In one implementation, the system may adjust the exponents to account for denormalized inputs. The system shifts these signficands (410, 412) based on the difference between the A*B product's exponent (not shown) and the C addend's exponent (not shown). The system is configured to distinguish between several cases of the relative sizes of the exponents, such as when the two exponents are comparable, when the addend's exponent is much greater and/or substantially greater than (>>) the product's exponent, and when the product's exponent is much greater and/or substantially greater than (>>) the addend's exponent.

In the example of FIG. 4, the exponent (not shown) of the A*B product is comparable to the exponent (not shown) of the C addend. A small difference between these exponents implies the magnitude of the product A*B and the addend C are similar. In such a case, the system enables different intermediate trade-off points, each providing an acceptable compromise between precision, rounding, and power savings. The system can designate bits below the trade-off point 402 as being low-order bits 406, and bits above the trade-off point 402 as being high-order bits 404. A trade-off point is based on the relative differences in the input exponents of the floating point numbers. A trade-off point is based the degree to which low-order bits can be ignored in the quest to save on the energy that would be expended to calculate the low-order bits for a given scenario of inputs. Note the system is not simply designed without the associated lower-bit logic. Such a drastic design would make the system inflexible. Rather, in various embodiments, the system is configured with modal gating logic that enables exact rounding in some cases, and clock-gating of this logic in other cases. For example, the system can clock-gate the logic (e.g., flip-flops) that would otherwise process the low-order bits 406. Meanwhile, the system enables the logic that processes the high-order bits 404. The clock-gating enables a power-reduced mode for non-IEEE-compliant operation. Power is reduced because much of the hardware needed to generate the properly rounded result is not needed (e.g., logic is clock-gated as described above) for generating the actual sum. Accordingly, the system can remove some portion of the low-order bits of the A*B product and/or the C addend from the overall generation of the final result of A*B+C.

Figure 5:
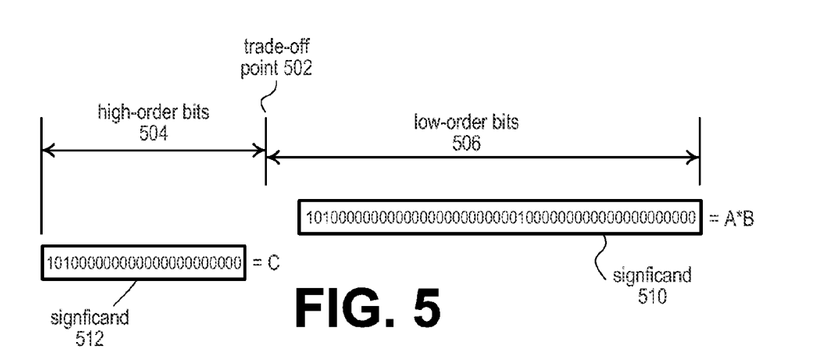
FIG. 5 is a conceptual diagram of another example FMA instruction, according to one embodiment of the present invention.

FIG. 5 is a conceptual diagram of another example FMA instruction scenario, according to one embodiment of the present invention. In this example, the exponent (not shown) of the addend C is much greater and/or substantially greater than (>>) the exponent (not shown) of the product A*B. A significand 510 of an A*B product includes 48 bits. A signficand 512 of a C addend includes 23 bits of fraction, where the leading 1 bit is added to form 24 bits. In another implementation, the addend 512 may include 24 bits. Again, the system evaluates the FMA by first inspecting the exponents of the incoming operands. The system can designate bits below the trade-off point 502 as being low-order bits 506, and bits above the trade-off point 502 as being high-order bits 504. Thus, in this case, the system can remove the entire A*B product from the overall generation of the final result of A*B+C.

Figure 6:
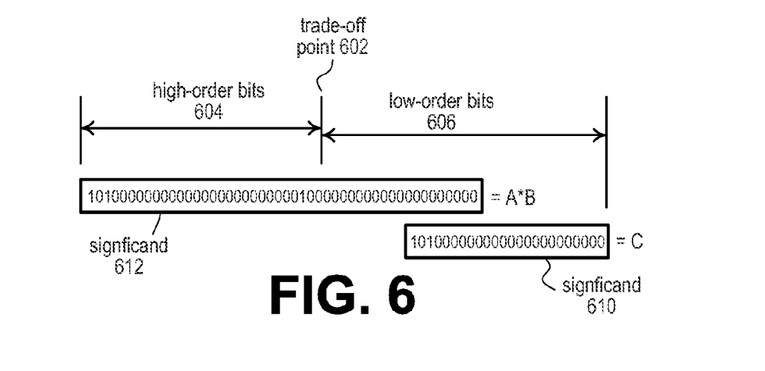
FIG. 6 is a conceptual diagram of yet another example FMA instruction, according to one embodiment of the present invention.

FIG. 6 is a conceptual diagram of yet another example FMA instruction scenario, according to one embodiment of the present invention. In this example, the exponent (not shown) of the addend C is much less and/or substantially less than (<) the exponent (not shown) of the product A*B. A significand 610 of an A*B product includes 48 bits. A signficand 612 of a C addend includes 24 bits, where the leading 1 bit is included. Again, the system evaluates the FMA by first inspecting the exponents of the incoming operands. The system can designate bits below the trade-off point 602 as being low-order bits 606, and bits above the trade-off point 602 as being high-order bits 604. Thus, in this case, the system can remove the addend C and a portion of the overall product from the overall generation of the final result of A*B+C.

Figure 7:
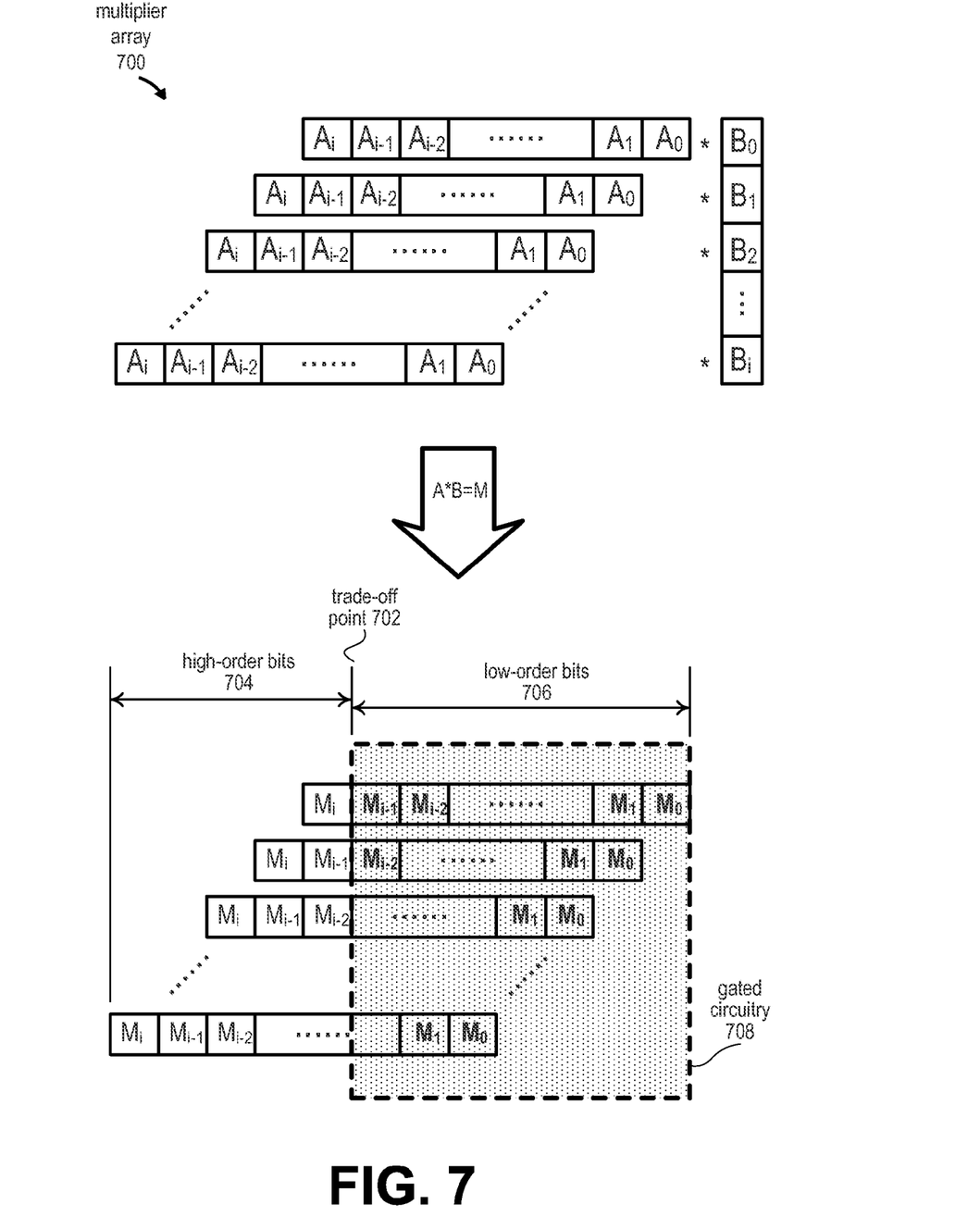
FIG. 7 is a conceptual diagram of an example multiplier array, according to one embodiment of the present invention.

FIG. 7 is a conceptual diagram of an example multiplier array 700, according to one embodiment of the present invention. The multiplier array 700 is an electronic circuit that the system uses to multiply two binary numbers (e.g., A*B). The multiplier array 700 may be built by using binary adders. The system can implement a variety of computer arithmetic techniques to generate the multiplier array 700. Most techniques involve computing a set of partial products, and then summing the partial products together. As further described below, the technique for multiplying base-2 integers (e.g., binary integers) is similar to the technique for conducting long multiplication on base-10 integers (e.g., decimal integers).

The multiplier array 700 is depicted as a familiar trapezoid leaning towards the right. The operand A is depicted by a first number $A_i \ldots A_0$. The operand B is depicted by a second number $B_i \ldots B_0$. In binary encoding, the first number $A_i \ldots A_0$ is multiplied by one digit (either 0 or 1) of second number $B_i \ldots B_0$. The outcome is an array of partial products $M_i \ldots M_0$, where each partial product is a row appropriately shifted. This multiplication by using partial products is much easier than in decimal, as the multiplication by 0 or 1 is just 0 or the first number $A_i \ldots A_0$. Accordingly, the multiplication of two binary numbers reduces to calculating partial products $M_i \ldots M_0$ (which are 0 or the first number), shifting the partial products left, and then adding the partial products together (a binary addition, of course).

Multiplication in binary is much simpler than in the decimal system, as there is no table of multiplication to remember, just shift and add operations. This technique has the advantage that a small CPU can perform the multiplication by using the shift and add features of the CPU's arithmetic logic unit, rather than a specialized circuit. The technique is slow, however, because the technique requires several intermediate addition operations, each of which takes time. Older multiplier architectures employed a shifter and accumulator to sum each partial product, often one partial product per cycle, trading off speed for die area. Faster multipliers may be engineered in order to do fewer additions. Modern multiplier architectures use the Baugh-Wooley algorithm, Wallace trees, or Dadda multipliers to add the partial products together in a single cycle. The performance of the Wallace tree implementation is sometimes improved by modified Booth encoding one of the two multiplicands, which reduces the number of partial products that must be summed.

As described above with reference to FIGS. 3-6, the system (e.g., the arithmetic subsystem 230) can designate bits below the trade-off point 702 as being low-order bits 706, and bits above the trade-off point 702 as being high-order bits 704. The system can use gated circuitry 708 to clock-gate the logic (e.g., flip-flops) that would otherwise process the low-order bits 706. Meanwhile, the system enables the logic that processes the high-order bits 704. Accordingly, the-clock-gating enables a power-reduced mode for non-IEEE-compliant operation. The power-reduced mode of the arithmetic subsystem 230 of FIG. 2 is described further below with reference to FIG. 8.

As an example of processing by using partial precision (e.g., IEEE incompliance), the system may write a pixel value where, say, only 32 bits of precision are needed. Assume the system is doing an A*B+C operation and writing the result as a 32-bit color (or depth) value in the frame buffer. Assume the significands for each of A, B, and C are 24-bits. Assume the 32-bit color or depth value is considered to be the integer portion of the A*B+C calculation. Accordingly, the system can ignore significant bits to the right of the binary point. In one implementation, the system can gate off portions of a multiply or addition in 12-bit chunks, though other configurations are possible.

As an example of multiplying A*B, let the operation be defined by the following equations:

$$A=1.1*2^{20} \qquad \text{Equation 4.}$$

$$B=1.01*2^2 \qquad \text{Equation 5.}$$

$$A*B=1.111*2^{22} \qquad \text{Equation 6.}$$

A computation that is IEEE-compliant (e.g., full precision) would produce a full 48-bit significand. In contrast, the present system is configured to use partial precision selectively or modally, as further described below with reference to FIG. 8. Inspecting the exponents, the system can determine that less than 24-bits of the result are important. The rightmost 24-bits of the significand are to the right of the trade-off point. The system can gate off the flip-flops of the low-order bits (e.g., lower 24-bits) of the multiplier array 700 and only let the flip-flops of the high-order bits (e.g., higher 24-bits) do the multiply operation. For instance, only the high-order bits 704 of the partial products are involved in the add operations.

Then, the system can add the operand C to the product A*B. The equation below is an example operand C:

$$C=1.101010101*2^{10} \qquad \text{Equation 7.}$$

When the system adds C to A*B, apparently, less than 12-bits are needed. The lower 12-bits of C are to the right of the binary point. Accordingly, the system can gate off the right 12-bits of the add operation.

Figure 8:
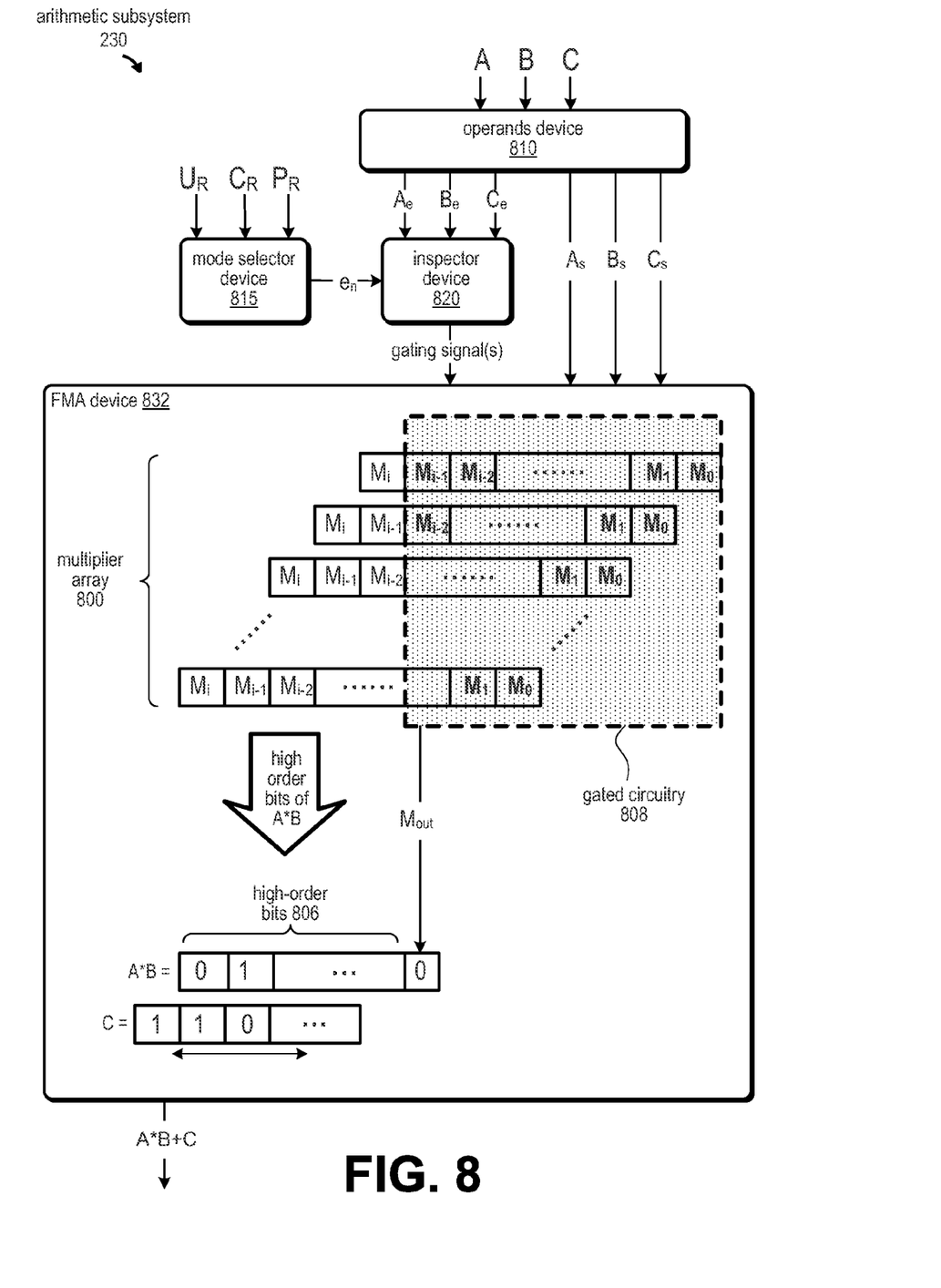
FIG. 8 is a conceptual diagram of the arithmetic subsystem of FIG. 2, according to one embodiment of the present invention.

FIG. 8 is a conceptual diagram of the arithmetic subsystem 230 of FIG. 2, according to one embodiment of the present invention. The arithmetic subsystem 230 is configured for carrying out fused multiply-add (FMA) instructions for floating point numbers. As describe above, an FMA instruction can be represented by A*B+C, where A, B, and C are floating-point numbers. The arithmetic subsystem 230 includes, without limitation, an operands device 810, a mode selector device 815, an inspector device 820, and an FMA device 832.

The operands device 810 is configured to receive an operand A, an operand B, and an operand C. Each operand (A, B, or C) is a floating-point number. The operand A includes, without limitation, an exponent $A_e$ and a significand $A_S$. The operand B includes an exponent $B_e$ and a significand $B_S$. The operand C includes an exponent $C_e$ and a significand $C_S$. The operands device 810 filters the operands by sending the exponents ($A_e$, $B_e$, $C_e$) to the inspector device 820, and sending the significands ($A_S$, $B_S$, $C_S$) to the FMA device 832.

The inspector device 820 includes logic devices that are configured to inspect the exponents ($A_e$, $B_e$, $C_e$) of the operands (A, B, C) and the enable bit(s) $e_n$. The inspector device 820 is strategically situated in the arithmetic subsystem 230 such that the inspector device 820 does not add significant timing stress to the arithmetic subsystem 230. Accordingly, the arithmetic subsystem 230 does not necessarily have to be configured with higher powered components that would be faster and would thereby eviscerate power-savings that the arithmetic subsystem 230 can provide. Further, in one implementation, the inspector device 820 does not gate every single flip-flop independently. There is a non-zero cost associated with the logic and circuitry for both determining when to gate each flip-flop and also the actual gating of the flip-flop. Accordingly, the inspector device 820 is configured to send one or more gating signals to the FMA device 832 in order to enable a broader collaboration of gating of flip-flops at the FMA device 832.

pow In one implementation, a designer (e.g., programmer and/or code writer) specifies a degree of granularity of gating for the FMA device 832, and inputs the degree of granularity into a computer having the arithmetic subsystem 230. The degree of granularity may be based on, for example, a determination of precision required for the particular FMA operation(s). The inspector device 820 is configured to receive the degree of granularity that the designer specifies. The inspector device 820 is configured to use the degree of granularity and logical analyses for determining the gating signals to send the FMA device 832.

In a first logic inspection, the inspector device 820 determines if the arithmetic subsystem 230 needs to operate in an IEEE-compliant mode for processing of the operands. Accordingly, the mode selector device 815 is configured to set the proper mode of operation (e.g., IEEE-compliant or not IEEE-compliant) based on the enable bit(s) ($U_R$, $C_R$, $P_R$). The mode selector 815 determines a mode for operation based on a mode request that the mode selector 815 may receive. The mode selector device 815 may receive a user request $U_R$, a compiler request $C_R$, or an application request $P_R$, among other types of requests. The user request $U_R$ can be associated with a manual override received from user input device. For example, a user of a mobile device (e.g., cell phone, smart phone, or tablet) may desire power savings over other considerations (e.g., fidelity of graphics rendering). The compiler request $C_R$ can configure the inspector device 820 for operations known at compile-time, which may or may not require full IEEE-compliant precision for the floating-point numbers. The application request $P_R$ can be custom-tailored for the particular application. For example, a writer of an application can designate an application either requires or does not require full IEEE-compliant precision for the floating-point numbers. For instance, a particular application may require the graphics rendering at less than a high fidelity. Accordingly, the mode selector device 815 may determine, in that situation, that operating in a non-IEEE-compliant mode is acceptable. The mode selector 815 then sends the mode represented by enable bit(s) $e_n$ to the inspector device 820.

In a second logic inspection, the inspector device 820 inspects the exponents ($A_e$, $B_e$, $C_e$) of the inputs A, B, and C. For example, the inspector device 820 can sum the exponents ($A_e$, $B_e$) for the operands of the product A*B. The inspector device 820 can then compare that sum to the exponent $C_e$ of the addend C. As explained above with reference to FIG. 4, if the two exponents are comparable (e.g., the sum of $A_e$ plus $B_e$, compared to $C_e$), the system can remove some portion of the low-order bits of the A*B product and/or the C addend from the overall generation of the final result of A*B+C. The inspector device 820 is configured to set the gating signals accordingly so the FMA device 832 can perform the proper gating. As explained above with reference to FIG. 5, if the addend's exponent is much greater and/or substantially greater than (>>) the product's exponent, the system can remove the A*B product from the overall generation of the final result of A*B+C. The inspector device 820 is configured to set the gating signals accordingly. As explained above with reference to FIG. 6, if the addend's exponent is much less and/or substantially less than (<<) the product's exponent, the system can remove the addend C product from the overall generation of the final result of A*B+C.

Accordingly, based on the enable bit(s) $e_n$ and the exponents ($A_e$, $B_e$, $C_e$), the inspector device 820 is configured to generate one or more controlling gating signals. The inspector device 820 sends the gating signal(s) to the FMA device 832. The FMA device 832 is configured to receive, among other things, the gating signal(s) from the inspector device 820 and the significands ($A_S$, $B_S$, $C_S$). The FMA device 832 uses the gating signals to power off (e.g., gate off) designated circuitry in one or more multiplier and adder arrays, as described above with reference to FIGS. 4-7. The FMA device 832 can generate either a full precision arithmetic operation (e.g., IEEE-compliant) or a partial precision arithmetic operation (e.g., non-IEEE-compliant). The partial precision arithmetic operation is generally less power-intensive. Accordingly, the inspector device 820 configures the FMA device 832 for a more power-efficient operation. The FMA device 832 is thereby configured to perform the actual power efficient operations with the multiplier and adder array(s). As described above, the inputs received (e.g., gating signals and signficands) are based on a combination of software considerations, compile-time, code writing time, code execution-time, and user-time, as well as actual real-time operands, among other factors.

As shown in FIG. 8, the FMA device 832 includes a multiplier array 800, like the multiplier array 700 described above with reference to FIG. 7. In one implementation, the multiplier array 800 in FIG. 8 is a typical multiplier array configured according to a commonly accepted standard. The FMA device 832 is configured to use the lower portion of the multiplier array 800 to generate both the low-order bits of the A*B product and a carry-out signal $M_{out}$ that is directed towards the upper portion of the multiplier.

When the gating signals from the inspector device 820 configure the FMA device 832 to operate in a power saving mode (e.g., IEEE non-compliant mode), the FMA device 832 can turn off a lower portion of the multiplier array 800 denoted as gated circuitry 808. For example, the FMA device 832 can turn off the lower portion using a clock gate, a power rail, or any other suitable mechanism for turning off circuitry, so as to reduce the total power consumed by the FMA device 832. The FMA operation can proceed in a similar manner to using the full multiplier array 800. However, in the power saving mode, the carry-out signal $M_{out}$ is designated as zero or any other value that indicates the lower-bits are not being used. This designation may ultimately lead to an incorrect value on the order of one unit of least precision (ULP), which is acceptable in the chosen power saving mode of operation.

The FMA device 832 is further configured to gate off more circuitry in operations involving the addition of the operand C to the product A*B, as described above with reference to FIGS. 4-6. The FMA device 832 can add the operand C to the product A*B in a power saving mode to generate the result of A*B+C. Then, the FMA device 832 is configured to output the result of A*B+C.

Accordingly, given that a portion of the logic circuitry is gated in the power-reduced case, the system is configured to take special care to ensure that the result A*B+C is not dependent on recent operand inputs received just prior to clock-gating. If this were not the case, the result A*B+C would depend on something more than the present inputs. Then, use of the logic circuitry would be difficult to verify and debug, and there would not be a clear benefit to the system being state-based.

A part of the system depends on being able to identify the floating-point operations associated with a particular portion of the A*B+C calculation (e.g., FMA calculation) and to apply a clock-gating signal to the flip-flops of the FMA device 832 of FIG. 8. In the case in which all logic is manually specified, and thus manually pipelined, such gating can be done at specification time by the designer. However, given the complexities of these designs, in one implementation, the system may be configured by using commercially-available synthesis packages for generating gate-level netlists. The system can then carry out a post-processing step to extract these flip-flops suitable for gating and add the latches necessary for glitch-free gating.

Advantageously, the system enables several different intermediate trade-off points to be made between precision (e.g., rounding) and power savings. The trade-off points are also based on the degree to which low-order bits can be ignored in the quest to save that would otherwise be expended to calculate fully the low-order bits for a given scenario of floating-point numbers. In one implementation, the trade-off points are based on the relative differences in the exponents of operands of a fused multiply-add (FMA) instruction. Examples of trade-off points are described above with reference to FIGS. 4-6.

Although the present technology is workable for single-precision arithmetic and double-precision arithmetic, the system is particularly suitable for single precision. There is not usually a scenario in which double-precision width operands are used yet exact rounding not also expected. A possible exception is for cases in which iterative algorithms are used, such as for computing the reciprocal or square root where intermediate values need-not be rounded.

Method Overview

Figure 9:
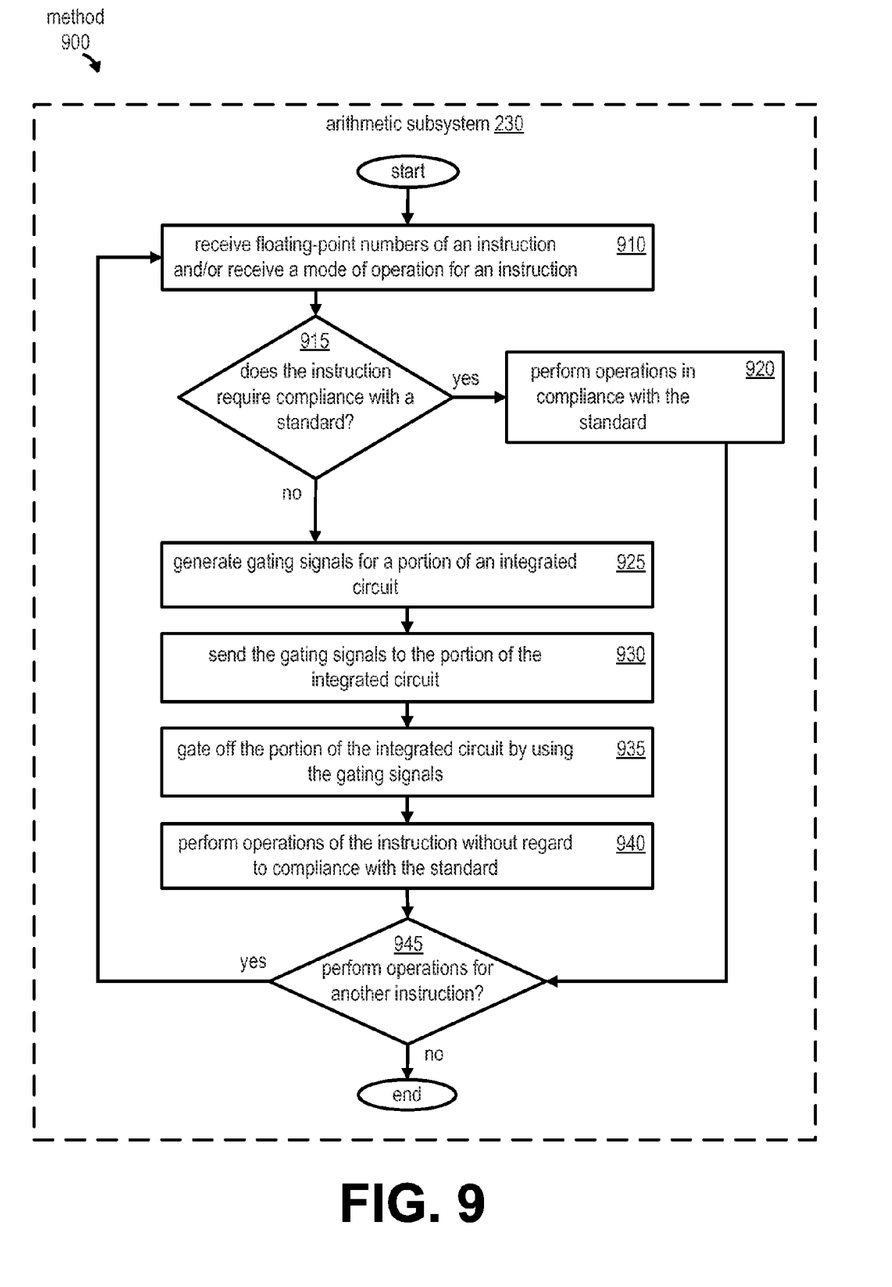
FIG. 9 is a flowchart of method steps for enabling reduced power in floating-point operations, according to one embodiment of the present invention.

FIG. 9 is a flowchart of method steps for enabling reduced power in floating-point operations, according to one embodiment of the present invention. Although the method steps are described in conjunction with the systems of FIGS. 1-8, persons skilled in the art will understand that any system configured to implement the method steps, in any order, falls within the scope of the present invention. In one embodiment, the method steps may be carried out by the arithmetic subsystem 230 of FIGS. 2 and 8. The arithmetic subsystem 230 includes the inspector device 820 and the FMA device 832, among other devices. Since details of system operations are described with reference to other figures, the method 900 of FIG. 9 is presented here in a summary fashion.

As shown, a method 900 starts in an action 910 where the arithmetic subsystem 230 (e.g., the inspector device 820) receives floating-point numbers of an instruction and/or receives a mode of operation for an instruction. For example, the floating-point numbers may include an operand A, an operand B, and an operand C of fused multiply-add (FMA) operation. The FMA operation may be represented in mathematical terms as A*B+C. As described above with reference to FIG. 8, the inspector device 820 can receive the mode of operation (e.g., enable bit(s)) from a mode selector device that identifies whether or not processing of the instruction is to be IEEE-compliant (e.g., full precision).

In a decision operation 915, if the arithmetic subsystem 230 (e.g., the inspector device 820) determines the instruction requires compliance with a standard of full precision for floating-point numbers, then the method 900 moves to an action 920 where the arithmetic subsystem 230 (e.g., the FMA device 832) performs operations for the instruction in compliance with the standard.

However, if the arithmetic subsystem 230 determines in decision operation 915 that the instruction does not require compliance with the standard, then method 900 moves to an action 925 where the arithmetic subsystem 230 generates gating signals for a portion of an integrated circuit. For example, as described above with reference to FIG. 8, the inspector device 820 can generate gating signals by inspecting exponents of the operands A, B, and C. The inspector device 820 can determine the fused multiply-add instruction is to be performed without using low-order bits of the operand C and/or without using low-order bits of a product of A*B. The inspector device can then generate proper gating signals for the integrated circuit.

In an action 930, the arithmetic subsystem 230 (e.g., the inspector device 820) sends the gating signals to the portion of the integrated circuit. For example, the inspector device 820 sends the gating signals to flip-flops of the integrated circuit that are to be gated off.

In an action 935, the arithmetic subsystem 230 (e.g., the FMA device 832) gates off the portion of the integrated circuit by using the gating signals. For example, the FMA device 832 gates off (e.g., power off) flip-flops of the integrated circuit that would otherwise perform multiply and/or add operations on low-order bits. In an action 940, the arithmetic subsystem 230 performs operations of the instruction without regard to compliance with the standard. For example, the FMA device 832 performs operations of the instruction A*B+C by using partial precision. The FMA device 832, by using partial precision of the present technology, undergoes fewer switches among flip-flops in the integrated circuit and thus operates at a reduced power.

In a decision operation 945, if the arithmetic subsystem 230 determines more operations are to be performed for another instruction, then the method 900 moves again to the action 910 where the arithmetic subsystem 230 receives other floating-point numbers and/or receives another mode of operation. However, if the arithmetic subsystem 230 determines operations are not to be performed for another instruction, then the method 900 concludes.

This method 900 may include other actions and/or details that are not discussed in this method overview. Other actions and/or details are discussed with reference to other figures and may be a part of the method 900, depending on the implementation.

The invention has been described above with reference to specific implementations. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A computer-implemented method for enabling power reduction in floating-point operations, the method comprising:
 receiving floating-point numbers, including an operand A, an operand B, and operand C of a fused multiply-add instruction, wherein the fused multiply-add instruction is represented as the operand A multiplied by the operand B plus the operand C;
 determining the fused multiply-add instruction does not require compliance with a standard of precision for floating-point numbers;
 inspecting exponents of operands by comparing an exponent of operand C with a sum of the exponents of operands A and B;
 generating gating signals for an integrated circuit based on inspecting the exponents of the operands, wherein the integrated circuit is configured to perform operations of the fused multiply-add instruction, and the gating signals are generated by identifying low-order bits of at least one of the operand C and a product of the operand A multiplied by the operand B that are unnecessary given that compliance with the standard of precision is not required; and
 sending the gating signals to the integrated circuit to turn off a plurality of logic gates included in the integrated circuit and associated with the low-order bits of the at least one of the operand C and the product of the operand A multiplied by the operand B.

2. The computer-implemented method of claim 1, further comprising:
 turning off the plurality of logic gates included in the integrated circuit via the gating signals; and
 performing one or more operations associated with the instruction without regard to compliance with the standard of precision.

3. The computer-implemented method of claim 1, wherein the standard of precision includes at least one of Institute of Electrical and Electronics Engineers (IEEE) 754, IEEE 754-1985, IEEE 854-1987, or IEEE 754-2008.

4. The computer-implemented method of claim 1, wherein determining the fused multiply-add instruction does not require compliance with the standard of precision comprises receiving a mode of operation for the fused multiply-add instruction that is associated with at least one of:
 a manual override received from a user input device;
 a compiler communication indicating the fused multiply-add instruction does not require compliance with the standard of precision; and
 an application communication indicating the application does not require compliance with the standard of precision.

5. The computer-implemented method of claim 1, wherein determining the fused multiply-add instruction does not require compliance with the standard of precision is associated with a particular application requiring graphics rendering at less than the standard of precision.

6. The computer-implemented method of claim 1, wherein multiplying the operand A and the operand B is performed via a multiplier array that is based on one or more partial products, and wherein the computer-implemented method further comprises:
 identifying low-order bits of the one or more partial products and high-order bits of the one or more partial products; and
 gating off flip-flops of the low-order bits of the partial products.

7. The computer-implemented method of claim 1, wherein generating the gating signals further includes inspecting exponents of operands by:
 determining that an exponent of the operand C is greater than a sum of an exponent of the operand A and an exponent of the operand B; and
 gating off flip-flops of the integrated circuit that is configured to multiply the operand A times the operand B.

8. The computer-implemented method of claim 1, wherein generating the gating signals further includes inspecting exponents of operands by:
- determining an exponent of operand C is less than a sum of an exponent of operand A plus an exponent of operand B; and
- gating off flip-flops of the integrated circuit that is configured to add the operand C.

9. An arithmetic subsystem for enabling power reduction in floating-point operations, the arithmetic subsystem comprising:
- an inspector device that comprises logic devices, wherein at least one of the logic devices:
  - receives floating-point numbers, including an operand A, an operand B, and operand C of a fused multiply-add instruction, wherein the fused multiply-add instruction is represented as the operand A multiplied by the operand B plus the operand C;
  - determines the fused multiply-add instruction does not require compliance with a standard of precision for floating-point numbers;
  - inspects exponents of operands by comparing an exponent of operand C with a sum of the exponents of operands A and B;
  - generates gating signals for an integrated circuit based on inspecting the exponents of the operands, wherein the integrated circuit is configured to perform operations of the fused multiply-add instruction, and the gating signals are generated by identifying low-order bits of at least one of the operand C and a product of the operand A multiplied by the operand B that are unnecessary given that compliance with the standard of precision is not required; and
  - sends the gating signals to the integrated circuit to turn off a plurality of logic gates included in the integrated circuit and associated with the low-order bits of the at least one of the operand C and the product of the operand A multiplied by the operand B.

10. The arithmetic subsystem of claim 9, further comprising a fused multiply-add device configured to:
- turn off the plurality of logic gates included in the integrated circuit via the gating signals; and
- perform one or more operations associated with the instruction without regard to compliance with the standard of precision.

11. The arithmetic subsystem of claim 9, wherein the standard of precision includes at least one of Institute of Electrical and Electronics Engineers (IEEE) 754, IEEE 754-1985, IEEE 854-1987, or IEEE 754-2008.

12. The arithmetic subsystem of claim 9, wherein determining the fused multiply-add instruction does not require compliance with the standard of precision comprises receiving a mode of operation for the fused multiply-add instruction that is associated with at least one of:
- a manual override received from a user input device;
- a compiler communication indicating the fused multiply-add instruction does not require compliance with the standard of precision; and
- an application communication indicating the application does not require compliance with the standard of precision.

13. The arithmetic subsystem of claim 9, wherein determining the fused multiply-add instruction does not require compliance with the standard of precision is associated with a particular application requiring graphics rendering at less than the standard of precision.

14. The arithmetic subsystem of claim 9, further comprising a fused multiply-add device configured to multiply the operand A times the operand B by using a multiplier array that is based on one or more partial products, and wherein the inspector device is further configured to identify low-order bits of the partial products and high-order bits of the partial products, and wherein the fused multiply-add device is further configured to gate off flip-flops of the low-order bits of the partial products.

15. The arithmetic subsystem of claim 9, wherein the inspector device is further configured to generate the gating signals by inspecting exponents of operands by determining that an exponent of the operand C is greater than a sum of an exponent of the operand A and an exponent of the operand B, and wherein the arithmetic subsystem further comprises a fused multiply-add device configured to gate off flip-flops of the integrated circuit that is configured to multiply the operand A times the operand B.

16. The arithmetic subsystem of claim 9, wherein the inspector device is further configured to generate the gating signals by inspecting exponents of operands, and wherein inspecting exponents of operands comprises determining an exponent of operand C is less than a sum of an exponent of operand A plus an exponent of operand B, and wherein the arithmetic subsystem further comprises a fused multiply-add device configured to gate off flip-flops of the integrated circuit that is configured to add the operand C.

17. One or more non-transitory computer-readable storage media comprising one or more instructions to enable power reduction in floating-point operations, wherein the one or more instructions, when executed, direct one or more processors to perform actions comprising:
- receiving floating-point numbers, including an operand A, an operand B, and operand C of a fused multiply-add instruction, wherein the fused multiply-add instruction is represented as the operand A multiplied by the operand B plus the operand C;
- determining the fused multiply-add instruction does not require compliance with a standard of precision for floating-point numbers;
- inspecting exponents of operands by comparing an exponent of operand C with a sum of the exponents of operands A and B;
- generating gating signals for an integrated circuit based on inspecting the exponents of the operands, wherein the integrated circuit is configured to perform operations of the fused multiply-add instruction, and the gating signals are generated by identifying low-order bits of at least one of the operand C and a product of the operand A multiplied by the operand B that are unnecessary given that compliance with the standard of precision is not required; and
- sending the gating signals to the integrated circuit to turn off a plurality of logic gates included in the integrated circuit and associated with the low-order bits of the at least one of the operand C and the product of the operand A multiplied by the operand B.

18. The non-transitory computer-readable storage media of claim 17, further comprising:
- turning off the plurality of logic gates included in the integrated circuit via the gating signals; and
- performing one or more operations associated with the instruction without regard to compliance with the standard of precision.

19. The non-transitory computer-readable storage media of claim 17, wherein multiplying the operand A and the operand B is performed via a multiplier array that is based on one or more partial products, and further comprising:
- identifying low-order bits of the one or more partial products and high-order bits of the one or more partial products; and
- gating off flip-flops of the low-order bits of the partial products.

20. The non-transitory computer-readable storage media of claim 17, wherein generating the gating signals further includes inspecting exponents of operands by:
- determining that an exponent of the operand C is greater than a sum of an exponent of the operand A and an exponent of the operand B; and
- gating off flip-flops of the integrated circuit that is configured to multiply the operand A times the operand B.

* * * * *